United States Patent [19]
Krause et al.

[11] Patent Number: 5,815,707
[45] Date of Patent: *Sep. 29, 1998

[54] DYNAMIC FUNCTION REPLACEMENT FOR STREAMS FRAMEWORK

[75] Inventors: Michael R. Krause, Boulder Creek; Yoshihiro Ishijima, San Jose, both of Calif.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 545,561

[22] Filed: Oct. 19, 1995

[51] Int. Cl.$^6$ ..................................................... G06F 9/40
[52] U.S. Cl. ............................................................. 395/681
[58] Field of Search ............................................. 395/681

[56] References Cited

U.S. PATENT DOCUMENTS

| | | | |
|---|---|---|---|
| 5,338,247 | 8/1994 | Goodwin et al. | 446/456 |
| 5,410,694 | 4/1995 | Uchida et al. | 707/1 |
| 5,517,668 | 5/1996 | Szwerinski et al. | 395/800 |
| 5,548,731 | 8/1996 | Chang et al. | 395/280 |

OTHER PUBLICATIONS (no author given), "Development Packages", STACKS, pp(4), Sep. 1994.

Richi, A Stream Input–Output System, AT&T Bell Laboritories Tech. Journal, vol. 63, No. 8, Oct. 1984, pp. 1897–1910.

Stevens, Advanced Programming In The UNIX® Environment, Addison–Wesley Pub. Co., Inc., 92, pp. 383–394 & 714.

Rago, UNIX® System V Network Programming, Addison–Wesley Pub. Co., Inc., 93, Ch. 3, pp. 95–147, Ch. 9, pp. 425–478, Ch. 10, pp. 479–537, Ch. 11, pp. 539–576.

*Primary Examiner*—Alvin E. Oberley
*Assistant Examiner*—St. John Courtenay, III

[57] ABSTRACT

An extension to the STREAMS framework, referred to as dynamic function replacement, uses data structures that contain function pointers which allow STREAMS to execute various module or driver functions without requiring framework modification, or understanding what these functions actually do beyond their rudimentary classifications. This provides a simple, yet elegant, mechanism for replacing these function definitions and, hence, changing the execution behavior of STREAMS modules and drivers without requiring the modules or drivers to be rewritten or modified.

29 Claims, 6 Drawing Sheets

DYNAMIC FUNCTION REPLACEMENT FOR STREAMS FRAMEWORK

BACKGROUND OF THE INVENTION

1. Technical Field

The invention relates to a framework for communications services in a data enterprise. More particularly, the invention relates to the STREAMS framework which provides communications services that include communications between terminals and a host computer, between processes on the same computer, and between processes on different computers.

2. Description of the Prior Art

STREAMS has become the industry de facto framework for implementing network protocols and various types of character device drivers (see S. Rago, UNIX System V Network Programming, Addison Wesley professional computing series (1993)). The STREAMS subsystem was designed to unify disparate and often ad hoc mechanisms that previously existed in the UNIX operating system to support different kinds of character based I/O. In particular, STREAMS was intended to replace the clist mechanism that provided support for terminal I/O.

In the clist-based terminal subsystem, each terminal line can have one associated processing element, referred to as a line discipline. The line discipline handles all special character processing. Thus, if a user required nonstandard processing of the terminal data stream, the line discipline could be changed, although only one line discipline may be associated with a terminal at a time.

STREAMS allows users to add ("push") and remove ("pop") intermediate processing elements, referred to as modules, to and from the data stream at will. The modules can be stacked so that more than one module can be used in the data stream at a time. This allows independent modules that perform simple tasks to be combined in useful ways to perform more complex tasks, in much that same way as UNIX commands are connected via shell pipelines.

Data transfer in a stream occurs by passing messages between adjacent processing elements. Only pointer to the messages are passed, avoiding the costly overhead of data copying. Messages are types and have an associated priority, both of which indicate how the message should be processed. Using message passing to perform I/O creates a data driven data transfer, rather than the demand driven data transfer associated with other character based subsystems.

In previous I/O subsystems, when a user wanted to read data from a device, the driver's read routine was invoked. Similarly, when a user wanted to write data, the driver's write routine was invoked. In STREAMS, drivers usually do not know when users are reading from or writing to the stream. A read is typically blocked until data are available, while a write results in messages being sent to the driver.

A simple stream (see FIG. 1) provides a bidirectional data path between a process 12 at user 11 level and a device driver 14 in the kernel 13. Data written by the user process travel downstream 15 toward the driver, and data received by the driver from the hardware travel upstream 16 to be retrieved by the user. Even though data travel up and down stream in messages, drivers and modules can treat the data flow as a byte stream.

A simple stream consists of two processing elements: the stream head 17 and a driver 14. The stream head consists of a set of routines that provide the interface between applications in user space and the rest of the stream in kernel space. When an application makes a system call with a STREAMS file descriptor, the stream had routines are invoked, resulting in the performance of data copying, message generation, or control operations. The stream head in the only component in the stream that can copy data between user space and kernel space. All other components effect data transfer solely by passing messages and thus are isolated from direct interaction with users of the stream.

The second processing element is the driver, found at the end or tail of the stream. The driver controls a peripheral device and transfers data between the kernel and the device. Because the driver interacts with hardware, the driver is referred to as a hardware driver. Another kind of driver, referred to as a software or pseudo driver, is not associated with any hardware. Instead, such driver provides a service to applications, such as emulating a terminal-like interface between communicating processes.

The stream head cannot be replaced in the same way that a driver can. Drivers can be added to the kernel simply by linking their object files with the kernel object files. The stream head, on the other hand, is provided with the kernel proper and is fixed. The same stream head processing routines are used with every stream in the system. Each stream head, however, is customizable to a small extent by changing the processing options it supports.

The fundamental building block in a stream is the queue (see FIG. 2). The queue links one component to the next, thereby forming the stream. Each component in the stream contains at least one pair of queues, i.e. one queue (21, 23) for the read side (upstream) and one queue (20, 22) for the write side (downstream). The queue serves as a location to store messages as they flow up and down the stream, contains status information, and acts as a registry for the routines that are used to process messages.

When one component want to pass a message along in the stream, the queue is used to identify the next component. Then, the next component queue is used to identify the function to call to pass the message to that component. In this manner, each component's queue provides an interface between the component and the rest of the stream.

A module 30 (see FIG. 3) is an intermediate processing element that can be dynamically added to, or removed from, the stream. Modules are structurally similar to drivers, but usually perform some kind of filter processing on the messages passing between the stream head and the driver. For example, a module might perform data encryption or translation between one interface and another.

Adding and removing modules are not the only ways that a user can customize a stream. A user can also establish and dismantle multiplexing configurations. Multiple streams can be linked underneath a special kind of software driver, referred to as a multiplexing driver or multiplexor 40 (see FIG. 4). The multiplexing driver routes messages between upper streams opened to access the driver, and lower stream that are linked underneath the driver. Multiplexing drivers are well suited to implementing windowing systems and networking protocols. Windowing systems multiplex data between multiple windows and the physical terminal. Networking protocols multiplex messages between multiple users and multiple transmission media.

While streams are used to connect processes with devices, they may also be used to connect processes with other processes. Pipes are implemented as streams in UNIX System V release 4. There are two kinds of pipes, i.e. unnamed pipes and named pipes. An unnamed pipe, also referred to as an anonymous pipe, has no entry in the file system name space. The pipe system call creates an unnamed pipe by allocating two stream heads 17a, 17b and pointing the write queue of each at the read queue of the other (see FIG. 5).

A named pipe, also referred to as a FIFO because data are retrieved therefrom in a first-in-first-out manner, is created via the mknod system call. It has a name in the file system and can be accessed with the open system call. A named pipe is actually one stream head 17 with it s write queue pointing at it s read queue (see FIG. 6). DAta written to a named pipe are available for reading from the same end of the pipe.

There are several advantages to STREAMS-based pipes. First, local interprocess communication ("IPC") uses the same mechanisms as remote, or networked, IPC. This allows applications to treat local IPC connections the same as remote connections. Most operations that can be applied to a stream can therefore be applied to a pipe. For example, modules can be pushed onto pipes to obtain more functionality. Second, STREAMS-based pipes are full duplex, allowing bidirectional communications between two processes with one pipe instead of two.

All communication within a stream occurs by passing pointers to STREAMS messages. The messages are typed, and the type indicates both the purpose of the message and its priority. Based on the type, a message can be either high priority or normal priority. The normal priority messages are further subdivided into priority bands for the purposes of flow control and message queuing.

Any data the user wants to transmit to the other end of the stream are packages in M_DATA messages by the stream head. This is the most common message type. If the user needs to send or receive control information, then an M_PROTO message is used. Control information is intended form a module or driver in the stream, is interpreted by that component, and is usually not transmitted past the component. A special message type, M_PCPROTO, is reserved for high priority control information, such as interface acknowledgments.

Simple messages are composed of one message block. More complex messages can be created by linking multiple message blocks together. These are then treated logically as larger messages. The data in one message block are viewed as being contiguous with the data in the next message block. The message structure is usually transparent to user level applications. One exception to this is when dealing with a complex message including both control information and user data.

Because the STREAMS mechanism is a subsystem of the UNIX kernel, it is important to understand the environment provided by the kernel. STREAMS drivers and modules must abide by the constraints imposed by both the STREAMS subsystem and the rest of the kernel. The Device Driver Interface/Driver-Kernel Reference Manual, Prentice-Hall, Englewood Cliffs, N.J. ("DDI/DKI") defines all the data structures and interface routines provided by the kernel for use by drivers and modules, as well as the entry points drivers and modules must define to operate in the kernel.

The DKI portion refers to implementation independent interfaces. It promotes portability for the same version of the operating system across different hardware architectures. The DDI portion refers to processor specific and platform specific interfaces. It promotes compatibility from release to release for a particular hardware architecture. Interface can belong to DDI, DKI, or both. Each system implementation includes its own version of the DDI/DKI. All systems share the same DKI. All systems using the same processor type have the same DDI, except for some platform specific interfaces.

With regard to such STREAMS enhancements as value added tracing and logging facilities, a third party provider is typically required to modify all of their code to add macros to STREAMS that enable such tracing and logging. This limits the number of developers willing to port to a particular platform because a developer must do something special for such platform, as opposed to writing to the standard. Thus, it is preferred that developers be able to use primarily standard code.

Additionally, whenever any extensions are added to the STREAMS framework, a performance penalty is also added because it becomes necessary to check, for example whether the system is tracing or logging. The performance penalty results, for example from a cache miss and/or where the CPU stalls because it is necessary to check for some global variable that is not normally referenced until such check is performed. If a global variable is being referenced, it is typically not in the system's cache. This results in a cache miss. A cache miss in a high speed processor can lead to a processor stall, reducing the effective performance of the system.

It would be advantageous to provide a STREAMS framework in which various enhancements or options were readily available without the twin penalties of added complexity/lack of compliance and performance degradation.

SUMMARY OF THE INVENTION

The invention provides an extension to the STREAMS framework that is referred to herein as dynamic function replacement. As discussed above, the STREAMS framework uses data structures which contain function pointers that allow STREAMS to execute various module or driver functions without requiring framework modification, or understanding what these functions actually do beyond their rudimentary classifications. Dynamic function replacement provides a simple, yet elegant, mechanism for replacing these function definitions and, hence, changing the execution behavior of STREAMS modules and drivers without requiring the modules or drivers to be rewritten or modified. With the extension herein described, the application developer, support, and the customer are provided with a dynamic mechanism for developing, modifying, and troubleshooting STREAMS modules and drivers.

DETAILED DESCRIPTION OF THE INVENTION

Figure 1:
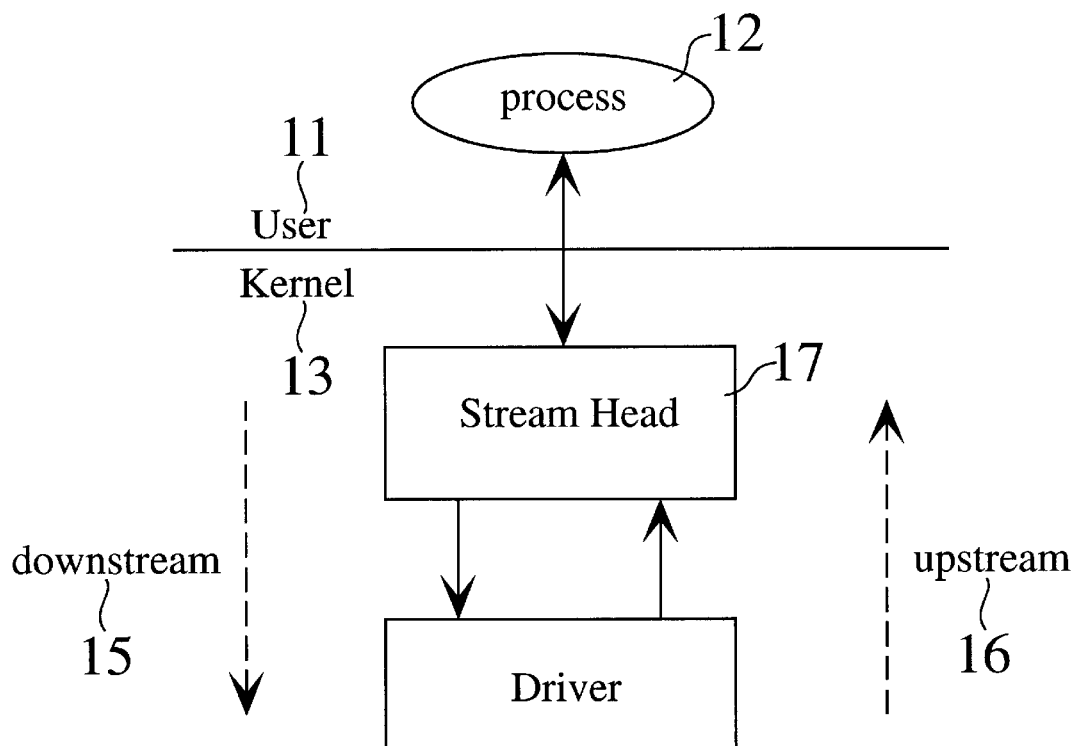
FIG. 1 is a block diagram that shows a simple stream.
Figure 2:
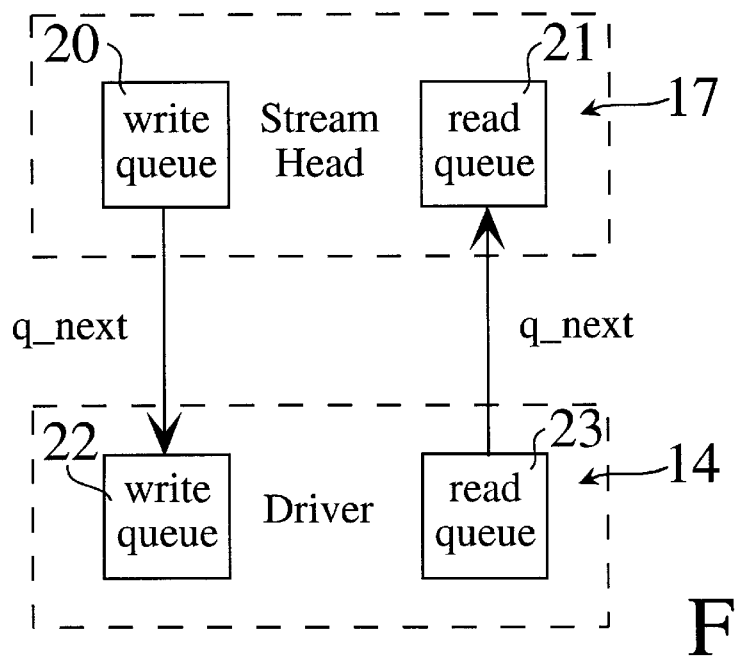
FIG. 2 is a block diagram that shows STREAMS queues.
Figure 3:
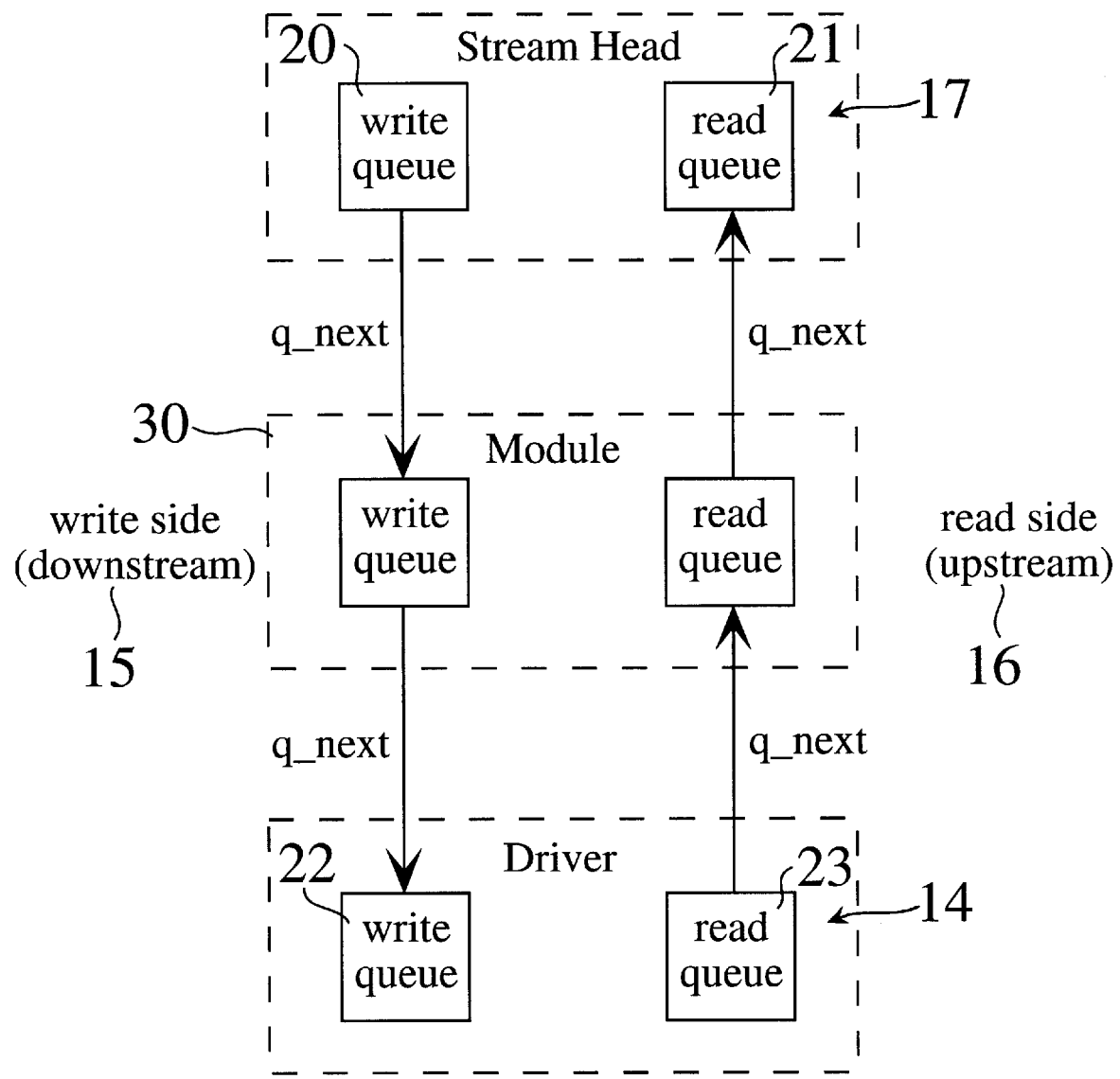
FIG. 3 is a block diagram that shows a module on a stream.
Figure 4:
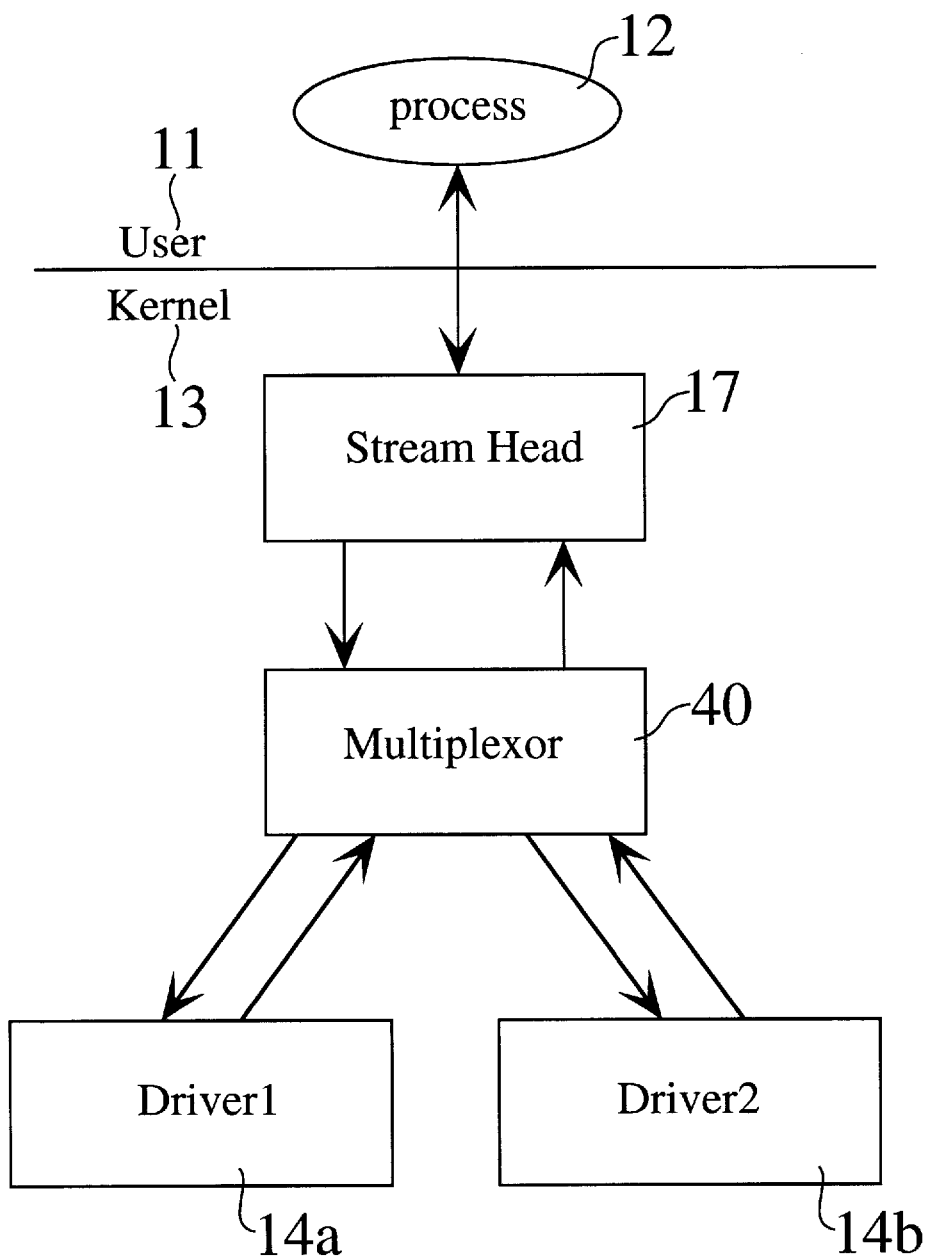
FIG. 4 is a block diagram that shows a multiplexing driver.
Figure 5:
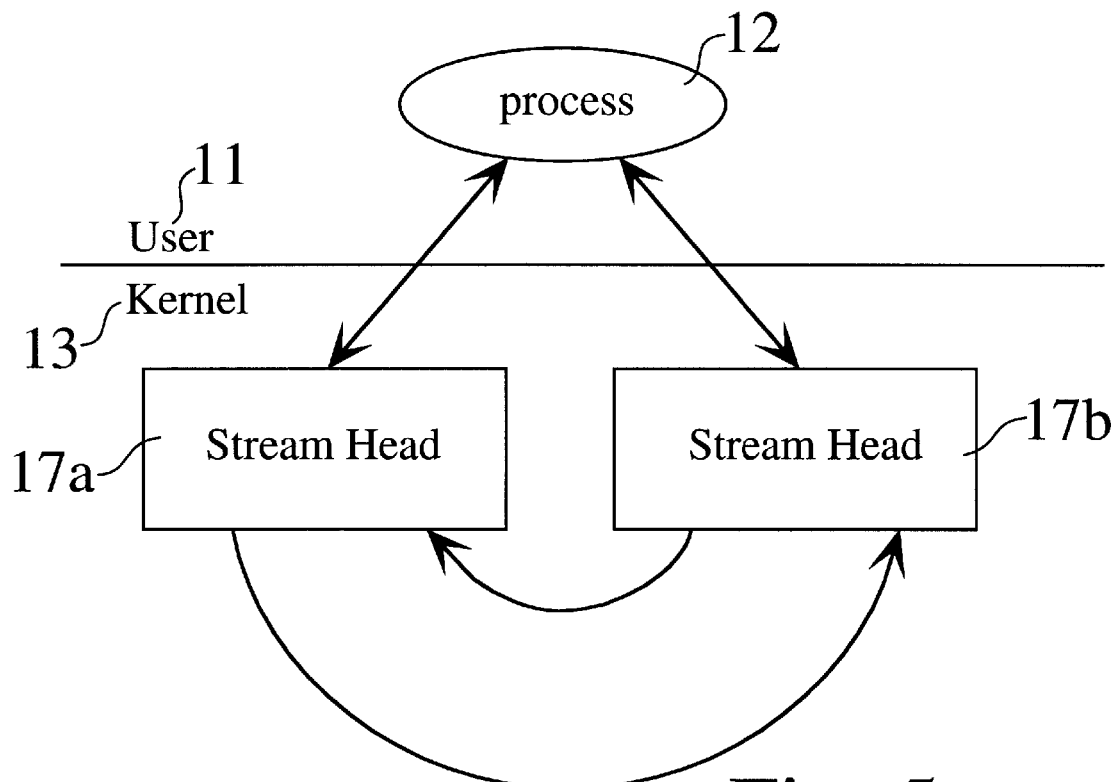
FIG. 5 is a block diagram that shows an anonymous pipe.
Figure 6:
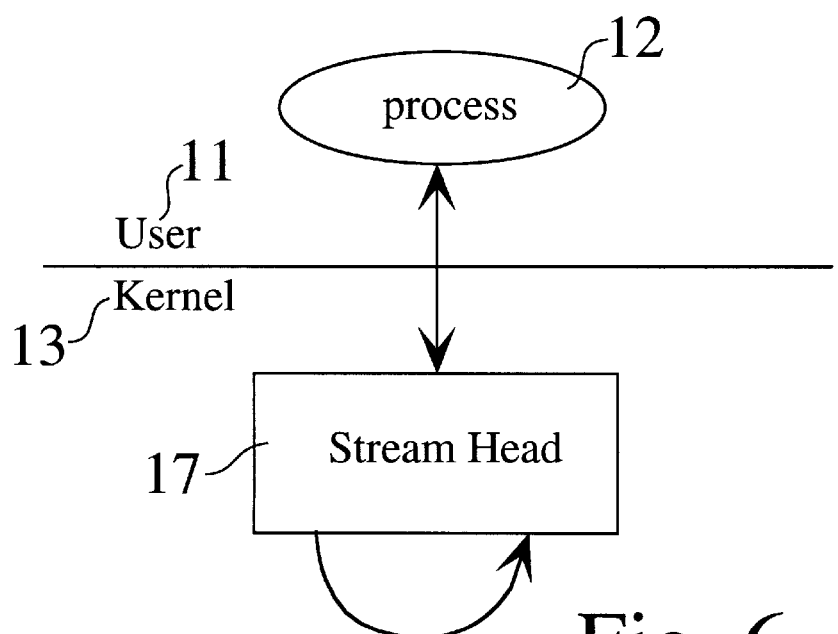
FIG. 6 is a block diagram that shows a FIFO.

The invention provides an extension to the STREAMS framework that is referred to herein as dynamic function replacement. As discussed above, the STREAMS framework uses data structures that contain function pointers which allow STREAMS to execute various module or driver functions without requiring framework modification, or understanding what these functions actually do beyond their rudimentary classifications. Dynamic function replacement provides a simple, yet elegant, mechanism for replacing these function definitions and, hence, changing the execution behavior of STREAMS modules and drivers without requiring the modules or drivers to be rewritten or modified.

With the extension herein described, the application developer, support organization, and the customer are provided with a dynamic mechanism for developing, modifying, and troubleshooting STREAMS modules and drivers. For example, overall system performance may be optimized, such that a penalty performance, such as is associated with tracing/logging, is only imposed when such tracing/logging function is actually enabled in the stream and not otherwise.

The developer may augment the original execution path or may replace it entirely, e.g. if the instance in question needs new functionality on-the-fly, without having to change all instances within the system. Such new functionality could be, for example, a failure catcher, or it may be making a particular instance use a specific conformance version of a module/driver, such as when the application requires an X/Open conformance level and the module/driver uses a default version which is not conformant to this level. The developer may allow the conformance version of the module/driver to be replaced on a per application instance basis, which helps to satisfy multiple needs on the system, a feature not normally possible in today's STREAMS implementations.

Because STREAMS is a complex kernel subsystem, the actual usages of the technique herein disclosed are not intuitively obvious, even to those who understand how the kernel or networking protocols work. The following provides sample usages for purposes of establishing a sufficient background to understand the invention.

One application of dynamic function replacement responds to the need to incorporate tracing and logging facilities within a given network driver or module. These facilities, while fairly light-weight in cost, still introduce a performance penalty because it is necessary to determine for every message if the message needs to be traced or logged. In addition, third-party code cannot use such proprietary tracing and logging utilities unless their code is modified to add these macros. Most developers do not like to do this because it adds to support and maintenance costs.

Sometimes it is only desired to examine a particular STREAMS instance, such as a connection between two systems. With today's tracing and logging mechanisms this is not possible, nor is it possible without writing complex code for the driver or module to respond for a particular instance. Dynamic function replacement allows replacement of either all module or driver instances or replacement on a per STREAMS queue basis. This allows developers, customers, and support to fine tune their alternative facilities, without effecting all other users of a particular subsystem. Such fine tuning for a particular instance does not affect the performance of other instances, such that other applications that are running over different stream instances continue to perform as before without any performance penalty.

By using dynamic function replacement the user can provide a new function that includes all tracing and logging services, while still executing the original execution path, without requiring any modification to the module or driver. In fact, by extending these new functions it is possible to offer a more flexible tracing and logging facility at any time, without requiring the driver or module to be rewritten. This also means that there are no performance penalties when tracing and logging functions are not necessary.

Dynamic function replacement allows third party developers to create new tracing and logging facilities which are customized to the need at hand instead of the generic facilities currently in use. This means that for large networked systems managing thousands of connections or within a multicomputer configuration, it is possible to customize the tracing facilities to trace only specific events or under specific conditions without having to pay a performance penalty for all other connections or driver instances.

In one embodiment of the invention, support facilities are able to apply custom failure catchers, not just tracing and logging, to target specific problems because the actual content of this new function is up to the developer. In fact, it is possible to apply a patch on a per instance basis, instead of wholesale replacement of a module or driver, which leads to many useful customer support and patching strategies that are not currently possible in any known STREAMS implementations.

One of the most difficult problems for kernel developers is creating problem conditions within modules and drivers to test exception conditions, or to drive a module or driver independently of the application or the rest of the stream's stack. Current testing mechanisms rely upon special test drivers and custom I/O controls ("ioctls") to drive the modules for a specific path and are very limited and difficult to develop and maintain.

Dynamic function replacement allows developers to treat the module or driver as a black box testing target by controlling what messages are created and sent and the timing involved. Such encapsulation concentrates the testing to a single path and allows increased flexibility and control of path execution. This leads to a higher quality module or driver, while total development and test time is reduced.

Dynamic function replacement also allows developers to develop STREAMS-based modules or drivers without requiring special tools from third-party companies. When dynamic loadable kernel modules become generally available, dynamic function replacement will provide a quick mechanism to apply any of the above usages without requiring the module or driver to be unloaded and reloaded which can cause productivity losses for a customer and may limit the software developer's ability to support its customers as quickly and painlessly as possible.

As can be seen from the above sample usages, the primary advantages of dynamic function replacement are:

- No performance penalties for tracing and logging, or any other type of functionality, to be implemented.
- Modules and drivers do not require special modifications to take advantage of facilities such as tracing and logging.
- Support can apply special failure catchers more easily and apply patches without effecting all users of a system when verifying if a patch works correctly or not, thereby reducing the effects on the customer's system.
- It is possible to target specific situations for activation down to the per-module, driver, or queue instance level.
- It provides a new tool to improve product quality and shorten development time.

In the preferred embodiment of the invention, dynamic function replacement uses standard SVR4.2 Device Driver Reference STREAMS data structures, although the invention is intended for application to other data structures and other frameworks. The data structures manipulated in the preferred embodiment of the invention are the streamtab and qinit structures. Each module or driver defines a streamtab structure that contains pointers to qinit structures.

qinit structures are for the read, write, read multiplexor, and write multiplexor queues which are created by the STREAMS framework.

qinit structures contain function address for the open, close, put, service, and administrative functions which are invoked by the STREAMS framework on behalf of the queue's owner, i.e. the module or driver.

The functions defined within the qinit structure are actually written by the module or driver developer and are automatically executed by the framework based on the current application execution path, such as a message flowing up or down a stream. Because the STREAMS framework knows the locations of all of these data structures and may access them independently of the application or the module or driver, dynamic function replacement remaps these structure addresses to alternative streamtabs and qinit structures that define the new function addresses. As a default, the STREAMS framework may provide enhancements, such as a standard alternative streamtab for tracing and logging facilities.

To understand the basic principles involved in operation of the invention, the following basic Streams framework data structures are provided. The three data structures of most interest are:

```
/* Streams queue initialization structure */
struct qinit {
int (*qi_putp)();           /*  Queue put procedure          */
int (*qi_srvp)();           /*  Queue service procedure      */
int (*qi_qopen)();          /*  Queue open procedure         */
int (*qi_qclose)();         /*  Queue close procedure        */
int (*qi_qadmin)();         /*  Queue administrative
                                procedure                    */
struct module_info * qi_minfo;
struct module_stat * qi_mstat;
}

/* Streams driver and module declaration structure */
struct streamtab {
struct qinit * st_rdinit;   /*  defines read QUEUE            */
struct qinit * st_wrinit;   /*  defines write QUEUE           */
struct qinit * st_muxrinit; /*  for multiplexing drivers only */
struct qinit * st_muxwinit; /*  ditto                         */
}

/* Streams queue structure */
struct queue {
struct qinit * q_qinfo;     /*  procedures and limits for
                                queue                         */
struct msgb * q_first;      /*  head of message queue         */
struct msgb * q_last;       /*  tail of message queue         */
struct queue * q_next;      /*  next QUEUE in Stream          */
struct queue * q_link;      /*  link to scheduling queue      */
void *    q_ptr;            /*  to private data structure     */
ulong     q_count;          /*  weighted count of characters
                                on q                          */
ulong     q_flag;           /*  QUEUE state                   */
long      q_minpsz;         /*  min packet size accepted      */
long      q_maxpsz;         /*  max packet size accepted      */
ulong     q_hiwat;          /*  high water mark, for flow
                                control                       */
ulong     q_lowat;          /*  low water mark                */
struct qband * q_bandp;     /*  band information              */
unsigned char q_nband;      /*  number of bands               */
unsigned char q_pad1[3]     /*  reserved                      */
```

-continued

```
struct queue * q_other;     /*  pointer to other Q in queue
                                pair                          */
QUEUE_KERNEL_FIELDS
}
```

These basic fields within these data structures are standardized via the SVR4.2 Device Driver Reference commonly referred to as the DDI (Device Driver Interface, discussed above).

External Specification For Configuring Alternative Streamtabs

New str_alt_install() routine configures the alternative streamtab's for Streams modules/drivers. The flags parameter specifies whether it is a module or driver:

STR_IS_MODULE for a module and STR_IS_DEVICE for a driver.

```
str_alt_install(name, flags, n, streamtabs)
char          *name;         /*  name of module or driver        */
unsigned int  flags;         /*  STR_IS_MODULE/DEVICE            */
int           n;             /*  number of alternative streamtabs */
struct        *streamtabs[]; /*  array of pointers to streamtabs  */
streamtab
```

Str_alt_install() returns 0 on success and −1 on failure.

For example, consider a Streams driver foo. The foo driver has the following alternative routines for tracing, debugging, and performance measurement:

```
foo_rput_trace(q, mp)
{
ktrc_write();      /*    call NETTL packet tracing routine  */
foo_rput(q, mp);   /*    call original rput routine         */
} foo_rput_debug(q, mp)
{
/*
* Original rput routine plus debugging code.
*/
} foo_rput_timestamp(q, mp)
{
timestamp();       /*    record entry timestamp             */
foo_rput(q, mp);   /*    call original rput routine         */
timestamp();       /*    record exit timestamp              */
}
```

Similarly, routines for rsrv, wput, wsrv, open, and close routines are defined, if desired. Then, qinit structures resemble the following:

```
struct qinit foo_rinit_trace = {
foo_rput_trace,foo_rsrv_trace,foo_open,foo_close,NULL,
&foo_minfo,NULL} struct qinit foo_rinit_debug = {
foo_rput_debug,foo_rsrv_debug,foo_open,foo_close,NULL,
&foo_minfo,NULL} struct qinit foo_rinit_timestamp = {
foo_rput_timestamp,foo_rsrv_timestamp,foo_open,foo_close,NULL,
&foo_minfo,NULL}
```

Similarly, qinit's for write side are defined. Then, the alternative streamtab's are defined:

```
struct streamtab foo_trace_info     = {&foo_rinit_trace,
                                       &foo_winit_trace};
struct streamtab foo_debug_info     = {&foo_rinit_debug,
                                       &foo_winit_debug};
struct streamtab foo_timestamp_info = {&foo_rinit_timestamp,
                                       &foo_winit_timestamp};
```

Finally, the alternative streamtab's are configured via str_alt_install():

```
struct streamtab * streamtabs[3] = {    &foo_trace_info,
                                        &foo_debug_info,
                                        &foo_timnestamp_info }
str_alt_install("foo", STR_IS_DEVICE, 3, streamtabs);
```

The str_alt_install(name, flags, n, streamtabs) fails if one of the following conditions occurs:
- name is NULL.
- n is negative.
- n is positive but streamtabs is NULL.
- Flags do not contain STR_IS_MODULE or STR_IS_DEVICE.
- The module/driver specified by the name has not been installed.
- Alternative streamtabs has been already installed AND there is an active instance of the module/driver.

When there is currently no alternative streamtabs installed, then, even if there is an active instance of the module/driver, str_alt_install() allows an alternative streamtabs to be installed. To change or uninstall the already installed alternative streamtabs, all the active instances of the module/driver must be closed first.

Uninstalling the alternative streamtabs is done by calling str_alt_install(name, flags, 0, NULL).

Besides the above developer-provided alternative streamtab's, STREAMS automatically provides a default alternative streamtab for each Streams module/driver that is automatically configured when the normal streamtab is configured. This default alternative streamtab exists even when there are no developer-supplied alternative streamtab's for the module/driver. All the contents of the qinit's of the default alternative streamtab are identical to that of the normal streamtab except for the put routines. The put routines of the default alternative streamtab do the following:
— Call network tracing and logging ("NETTL") to trace the message: ktrc_write() with

```
subsys_id =    STREAMS
kind =         PDU_IN for M_DATA at read-side,
               HDR_IN for other message types at read-side,
               PDU_OUT for M_DATA at write-side,
               HDR_OUT for other message types at write-side.
path_id =      module id
```

— Call the original routine.

External Specification For Dynamically Alternating Streamtabs

Two new STREAMS ioctl commands are used to alternate dynamically the Streams module's/driver's streamtab's. One of the ioctl commands is used to alter active instances of a module, and the other ioctl command is used to alter future instances of a module.

```
#include <sys/types.h>
#include <stropts.h>
#include <stream.h>
int ioctl (int fd, int command, arg);
```

I_ALTSTRTAB_ACTIVE is the new STREAMS ioctl command and it allows the owner of the target stream or the super-privileged administrator to alternate qinit routines for the given active instance of a module/driver. The arg must point to straltactive structure which contains the following members:

```
long           alt_major;              /* major number              */
long           alt_minor;              /* minor number              */
int            alt_index;              /* alternative streamtab     */
                                       /* index                     */
un-            alt_flags;              /* STR_IS_MODULE/            */
signed                                 /* DEVICE                    */
int
char           alt_name[FMNAMESZ+1];   /* name of module or         */
                                       /* driver                    */
```

- The alt_name is the name of the target module/driver terminated by a null character, and it must match with the name that was passed in str_install() or str_alt_install().
- The alt_flags specifies that the target is a module or a driver.
- The pair of alt_major and alt_minor specifies the stream in which the target module/driver is searched for. If alt_major is ALT_OWN_MAJOR, then alt_minor is ignored and the stream on which this ioctl is called is the target stream. If alt_major is not ALT_OWN_MAJOR, the credential of the caller is checked and only the privileged user is allowed to proceed. If the alt_minor is ALT_ALL_MINORS, all the active streams specified by the alt_major is the target streams. The privileged user can typically use the streams administration driver ("SAD"), which is a standard component of all STREAMS implementations, to alter the arbitrary stream's module/driver, but it does not have to be the SAD driver. The SAD driver is a STREAMS administration driver that knows every STREAM in the system, and that knows where each STREAM is located.
- The alt_index field specifies which alternative routines are to be used. Suppose the module configure N alternative streamtab's via str_alt_install(), then it may take on one of the following values:

| | |
|---|---|
| NORMAL_L STRTAB | Routines in the original streamtab. |
| DEFAULT_ALT_STRTAB | Routines in the default alternative streamtab. |
| 0 | Routines in the first streamtab passed via str_alt_install. |
| 1 | Routines in the second streamtab passed via str_alt_install. |
| . | |
| . | |
| . | |
| N-1 | Routines in the Nth streamtab passed via str_alt_install. |

On failure, errno is set to the following value:

| | |
|---|---|
| EACCES | The alt_major is not ALT_OWN_MAJOR and the user does not have the super-privilege. |
| EFALUT | The arg points outside the allocated address space. |

| | | | | |
|---|---|---|---|---|
| EINVAL | | The alt_name, alt_major, alt_minor, alt_flags, or alt_index is invalid. | | |

To allow alternating qinit routines of the modules/drivers of the streams that are linked under multiplexors, I_ALTSTRTAB_ACTIVE ioctl can be called to the streams that are linked under a multiplexor. For example, to alternate lower mux routines, I_ALTSTRTAB_ACTIVE ioctl can be called to the lower stream specifying the name of the multiplexor.

To allow alternate qinit routines of lower multiplexors, I_ALTSTRTAB_ACTIVE ioctl can be called to the streams that are linked under a multiplexor. I_ALTSTRTAB_FUTURE is the other command and it alters the qinit routines of subsequently opened instances of the module/driver. This command also alters the module info that is sent to the module specified by the alternative streamtab, i.e. the subsequent open's of the module/driver use the alternative streamtab: alternative qinit's and alternative module_info. This ioctl command does not affect the active instances of the module/driver. The arg must point to a straltfuture structure which contains the following members:

| | | | | |
|---|---|---|---|---|
| int | alt_index; | /* | alternative streamtab index | */ |
| unsigned int | alt_flags; | /* | STR_IS_MODULE/ DEVICE | */ |
| char | alt_name[FMNAMESZ+1]; | /* | name of module or driver | */ |

The alt_name field and alt_index field are described above. On failure, errno is set to the following value:

EACCES The user does not have the super-privilege.

EFALUT The arg points outside the allocated address space.

EINVAL The alt_name, alt_flags, or alt_index is invalid.

Internal Design

The following discussion is directed to read-side routines. For other routines, i.e. write-side, mux-read-side, and mux-write-side, the dynamic function replacement mechanism herein described works similarly. The following streamtab's are provided per module, not per an instance of a module.

● Original normal streamtab.
● Default alternative streamtab.
● The alternative streamtab's that the module installed via str_alt_install().

Also there is one modsw structure for each installed module/driver. New struct modsw is as follows:

| | | | | |
|---|---|---|---|---|
| struct modsw { | | | | |
| struct modsw * | d_next; | /* | next modsw | */ |
| struct modsw * | d_prev; | /* | previous modsw | */ |
| char | d_name[FMNAMESZ+1]; | /* | unique module name | */ |
| char | d_flags; | /* | OLD_OPEN, UP_MODE | */ |
| SQHP | d_sqh; | /* | for module/elsewhere synch | */ |
| int | d_curstr; | /* | current streamtab | */ |
| | | | index | |
| struct streamtab * | d_str; | /* | normal streamtab | */ |
| struct streamtab * | d_default_alt; | /* | default alternative streamtab | */ |
| int | d_naltstr; | /* | # of alternative streamtabs | */ |
| struct streamtab * | d_altstr; | /* | alternative streamtab array | */ |
| int | d_sq_level; | /* | synch level | */ |
| int | d_nrefcnt; | /* | reference count | */ |
| int | d_major; | /* | major # (should be unique) | */ |
| }; | | | | |

The struct queue has a new filed within QUEUE_KERNEL_FIELDS:

| | |
|---|---|
| struct modsw * q_modsw; | /* pointer to struct modsw */ |

The essence of the algorithms for I_ALTSTRTAB_ACTIVE ioctl and I_ALTSTRTABL_FUTRUE ioctl are as follows:

I_ALTSTRTAB_ACTIVE ioctl

```
if (alt_major == ALT_OWN_MAJOR)
{
    current sth is the target stream:
}
else
{
    check the caller's credentials;
    find sth for [alt_major, alt_minor];
}
acquire mult_sqh lock to prevent plumbing;
search for the target queue specified by alt_name[];
q->q_qinfo = pointer to the appropriate alternative qinit;
```

I_ALTSTRTABL_FUTRUE ioctl

```
check the caller's credentials
find modsw for module specified by alt_name[];
modsw.d_curstr = alt_index;
```

Figure 7:
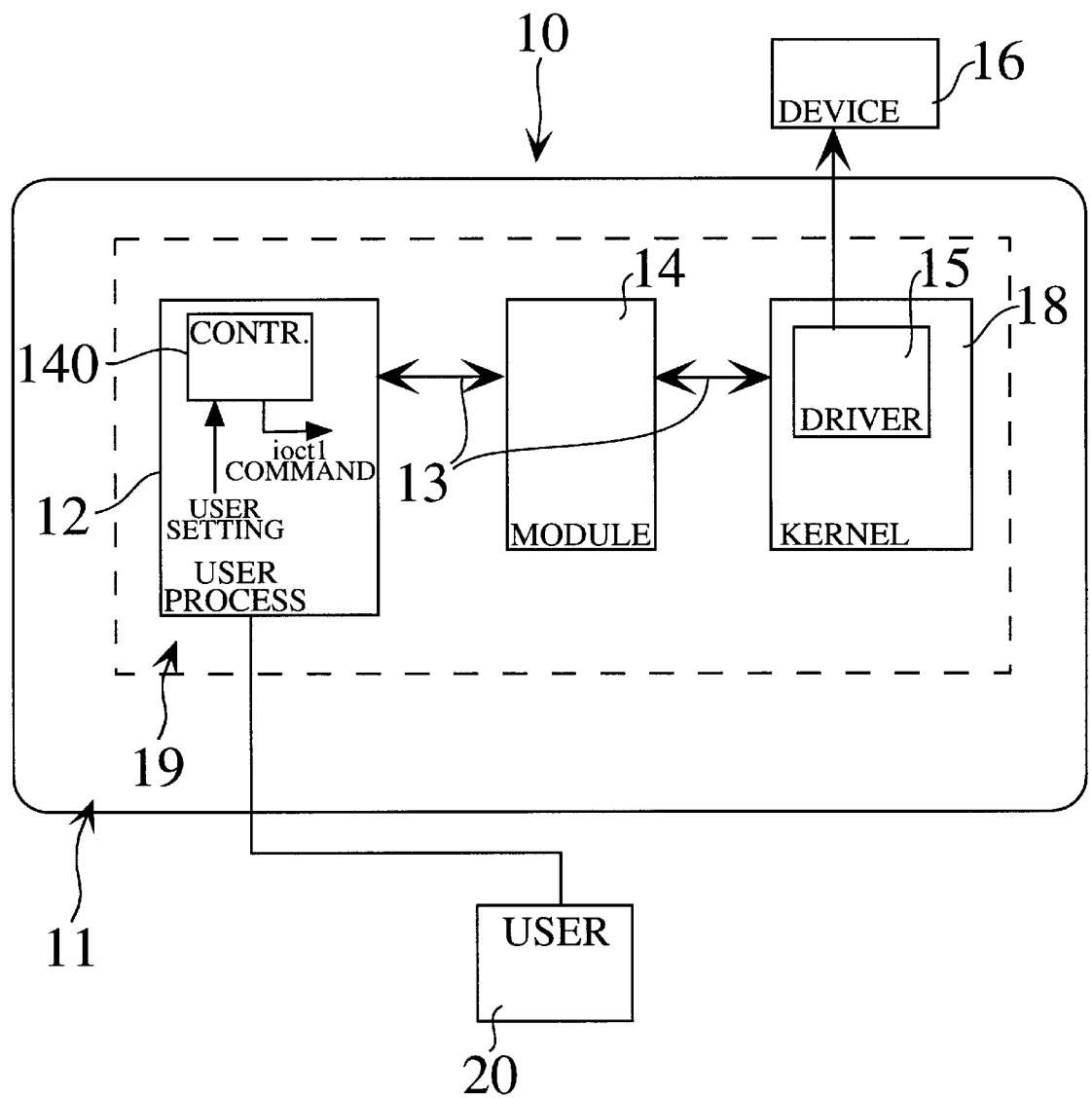
FIG. 7 is a block schematic diagram showing a data structure that implements dynamic function replacement for a STREAMS framework in accordance with the invention.

FIG. 7 is a block schematic diagram showing a data structure that implements dynamic function replacement for a STREAMS framework in accordance with the invention. The data structure 10 is implemented in a computer system 11 that provides a bidirectional data path 13 between a user process 12, a module 14 which is an intermediate processing element that can be dynamically added to, or removed from, said data path, and a device driver 15. The device driver is resident in a system kernel 18 and controls a peripheral device 16 to transfer data between said kernel and said device. Data written by the user process travel downstream toward the driver, and data received by the driver from the device travel upstream to be retrieved by a user 20.

Figure 8:
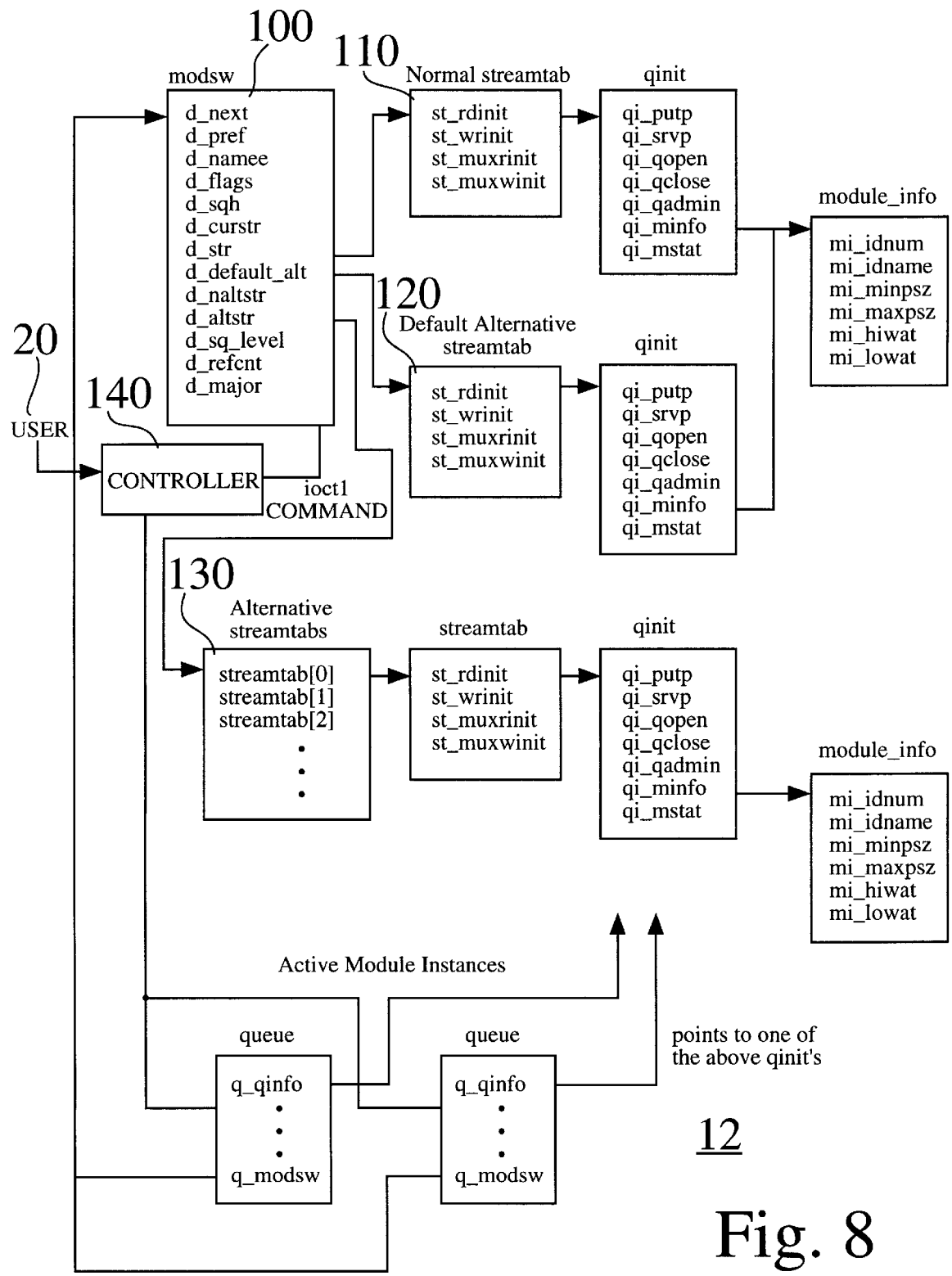
FIG. 8 is a block diagram showing a data structure for a STREAMS framework that incorporates dynamic function replacement in accordance with the invention.

After a module/driver is installed via the utilities that are used to install a module/driver into the system, i.e. str_install() and str_alt_install(), the data structures resemble those shown on FIG. 8, which illustrates the simplicity of replacing functionality on-the-fly, based on application needs. The preferred embodiment of the invention primarily updates data structures, which not only adds simplicity, but also avoids problems associated with multiprocessor implementations and scaling. These data structures may be updated such that there are no race or timing issues because such structures are controlled by the STREAMS framework and not by the module/driver developer. In addition, by using standard structures, it is not necessary to provide developers with specialized training, should they desire to implement their products in accordance with the herein described invention. Thus, the invention speeds development time, reduces cost, and makes developer acceptance more likely.

The data structure minimally includes a normal function 110 that implements a specific module or driver instance; at least one alternative function 120, 130 that implements an optional module or driver instance; and a controller 140 that generates a control command that dynamically replaces the normal function with at least one alternative function, while either still executing an original execution path or executing a new execution path, and without requiring any modification to the module and the driver.

The data structure can include an alternative function, for example that customizes system tracing facilities to trace only specific events or under specific conditions; that provides support facilities for applying custom failure catchers to target specified system problems; that applies a patch on a per instance basis; that allows testing to a single data path and that allows increased flexibility and control of data path execution; or that allows replacement of either all module or driver instances or replacement on a per instance basis.

The data structure is implemented in a STREAMS framework 19, wherein each module or driver defines a streamtab structure that contains pointers to qinit structures (see FIG. 8). In the data structure, the qinit structures are for read, write, read multiplexor, and write multiplexor queues which are created by said STREAMS framework, while the qinit structures contain function addresses for open, close, put, service, and administrative functions which are invoked by the STREAMS framework on behalf of a module or driver. Functions defined within the qinit structures are automatically executed by the STREAMS framework based on a current application execution path.

Thus, the controller 140 generates control commands that remap addresses of said structures to alternative streamtabs and qinit structures that define new function addresses. In one embodiment of the invention, all contents of the qinit structures of an default alternative streamtab are identical to those of a normal streamtab except for put routines.

The controller generates control commands that may include at least one STREAMS ioctl command that is used to alternate dynamically STREAMS module's/driver's streamtab's, an ioctl command that is used to alter active instances of a module, and/or an ioctl command that is used to alter future instances of a module.

The data structures include the MODSW table 100 which defines all the driver information. In the MODSW table there are pointers into the different streamtabs 110, 120, 130. The herein disclosed data structure adds at least one new streamtab entry to the MODSW table, e.g. the d_default_ alt entry, which is used to select a default alternative streamtab 120. When a specific driver or module is installed into the system, the user or developer can define what they want that default to be. The herein described data structure then allows any number of alternative streamtabs via a linked list of streamtabs. Thus, if the user wanted to perform conformance testing, and then wanted to perform functional testing, it would not be necessary to reload the system. Rather, it is only necessary to select a new streamtab.

By arranging the data structures, it is possible to add enhancements or optional data structures. For example, when a STREAM is opened inside each queue, there is a read queue and a write queue (as discussed above). In the read queue, there are pointers referred to as queue info. The queue info points back to another streamtab, such that it is possible to select any of these alternatives streamtabs on the fly. By default, the system selects a particular streamtab, e.g. normal streamtab 110. But if desired, the queue pointer can be set to any of the alternative streamtabs 120, 130 that are configured within the system. From a user space point of view, it is only necessary to implement a controller that generates one or more IOCTL commands to specify which streamtab is to be selected. As a result of such selection, there is no modification to the STREAMS' framework, i.e. it is not necessary to stop an application. Thus, the STREAMS framework itself is adapted to implement such alternative functions and enhancements. It is only necessary to enable the additional IOCTL commands, and then the data structures are created that include predefined functions.

In the modsw (FIG. 8), the pointer d_curstr is the current streamtab. Thus, when an alternative streamtab is selected and then the system is returned to a current state, the pointer d_curstr sets the system back to the current streamtab. Accordingly, FIG. 8 provides a block schematic representation of a template in accordance with the invention that includes a structure, for example for a QINIT for tracing, debugging and time stamping; for alternative streamtabs, for example for installing an enhanced or optional function; and sample code that can be invoked by a user or developer, for example for specific system testing.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. A data structure implemented in a computer system that provides a bidirectional data path between a user process, a module which is an intermediate processing element that can be dynamically added to, or removed from, said data path, and a device driver, said device driver being resident in a system kernel and controlling a peripheral device to transfer data between said kernel and said device, where data written by said user process travel downstream toward said driver, and where data received by said driver from said device travel upstream to be retrieved by a user, the data structure comprising:

a normal function that implements a specific module or driver instance;

at least one alternative function that implements an optional module or driver instance; and a controller for generating a control command that remaps addresses of said normal function and said at least one alternative function to define new function addresses that dynamically replace said normal function with said at least one alternative function, thereby implementing said optional module or driver or instance to dynamically change the execution behavior of said data structure, while either still executing an original execution path or executing a new execution path, and without requiring any modification to said module and said driver.

2. The data structure of claim 1, further comprising:

an alternative function that customizes system tracing facilities to trace only specific events or under specific conditions.

3. The data structure of claim 1, further comprising:

an alternative function that provides support facilities for applying custom failure catchers to target specified system problems.

4. The data structure of claim 1, further comprising:
an alternative function that applies a patch on a per instance basis.

5. The data structure of claim 1, further comprising:
an alternative function that allows testing to a single data path and that allows increased flexibility and control of data path execution.

6. The data structure of claim 1, further comprising:
an alternative function that allows replacement of either all module or driver instances or replacement on a per instance basis.

7. The data structure of claim 1, wherein said system is implemented in a STREAMS framework.

8. The data structure of claim 7, wherein each module or driver defines a streamtab structure that contains pointers to qinit structures.

9. The data structure of claim 8, wherein said qinit structures are for read, write, read multiplexor, and write multiplexor queues which are created by said STREAMS framework.

10. The data structure of claim 8, wherein said qinit structures contain function addresses for open, close, put, service, and administrative functions which are invoked by said STREAMS framework on behalf of a module or driver.

11. The data structure of claim 8, wherein functions defined within said qinit structures are automatically executed by said STREAMS framework based on a current application execution path, and wherein said controller generates control commands that remap addresses of said structures to alternative streamtabs and qinit structures that define new function addresses.

12. The data structure of claim 11, wherein all contents of said qinit structures of an default alternative streamtab are identical to those of a normal streamtab except for put routines.

13. The data structure of claim 8, said controller further comprising:
at least one STREAMS ioctl command that is used to alternate dynamically STREAMS module's/driver's streamtab's.

14. The data structure of claim 13, said controller further comprising:
an ioctl command that is used to alter active instances of a module.

15. The data structure of claim 13, said controller further comprising:
an ioctl command that is used to alter future instances of a module.

16. A data structure implemented in a computer system that provides a bidirectional data path between a user process, a module which is an intermediate processing element that can be dynamically added to, or removed from, said data path, and a device driver, said device driver being resident in a system kernel and controlling a peripheral device to transfer data between said kernel and said device, where data written by said user process travel downstream toward said driver, and where data received by said driver from said device travel upstream to be retrieved by a user, said system being implemented in a STREAMS framework in which each module or driver defines a streamtab structure that contains pointers to qinit structures, the data structure, comprising:
a normal function that implements a specific module or driver instance;
at least one alternative function that implements an optional module or driver instance; and
a controller for generating a control command that remaps addresses of said normal function and said at least one alternative function to define new function addresses that dynamically replace said normal function with said at least one alternative function, thereby implementing said optional module or driver or instance to dynamically change the execution behavior of said data structure, while either still executing an original execution path or executing a new execution path, and without requiring any modification to said module and said driver.

17. The data structure of claim 16, further comprising:
an alternative function that customizes system tracing facilities to trace only specific events or under specific conditions.

18. The data structure of claim 16, further comprising:
an alternative function that provides support facilities for applying custom failure catchers to target specified system problems.

19. The data structure of claim 16, further comprising:
an alternative function that applies a patch on a per instance basis.

20. The data structure of claim 16, further comprising:
an alternative function that allows testing to a single path and that allows increased flexibility and control of path execution.

21. The data structure of claim 16, further comprising:
an alternative function that allows replacement of either all module or driver instances or replacement on a per instance basis.

22. A method for implementing a data structure in a computer system that provides a bidirectional data path between a user process, a module which is an intermediate processing element that can be dynamically added to, or removed from, said data path, and a device driver, said device driver being resident in a system kernel and controlling a peripheral device to transfer data between said kernel and said device, where data written by said user process travel downstream toward said driver, and where data received by said driver from said device travel upstream to be retrieved by a user, said system being implemented in a STREAMS framework in which each module or driver defines a streamtab structure that contains pointers to qinit structures, the method comprising the steps of:
providing a normal function that implements a specific module or driver instance;
providing at least one alternative function that implements an optional module or driver instance; and
generating, with a controller, a control command that remaps addresses of said normal function and said at least one alternative function to define new function addresses that dynamically replace said normal function with said at least one alternative function, thereby implementing said optional module or driver or instance to dynamically change the execution behavior of said data structure, while either still executing an original execution path or executing a new execution path, and without requiring any modification to said module and said driver.

23. The method of claim 22, wherein said qinit structures are for read, write, read multiplexor, and write multiplexor queues which are created by said STREAMS framework.

24. The method of claim 22, wherein said qinit structures contain function addresses for open, close, put, service, and administrative functions which are invoked by said STREAMS framework on behalf of a module or driver.

25. The method of claim 22, further comprising the steps of:

automatically executing functions defined within said qinit structures by said STREAMS framework based on a current application execution path; and generating a control command to remap addresses of said structures to alternative streamtabs and qinit structures that define new function addresses.

26. The method of claim 22, wherein all contents of said qinit structures of an default alternative streamtab are identical to those of a normal streamtab except for put routines.

27. The method of claim 22, further comprising the step of:

using at least one STREAMS ioctl command to alternate dynamically STREAMS module's/driver's streamtab's.

28. The method of claim 27, further comprising the step of:

using an ioctl command to alter active instances of a module.

29. The method of claim 27, further comprising the step of:

using an ioctl command to alter future instances of a module.

* * * * *